United States Patent

[11] 3,575,507

| [72] | Inventors | Robert J. Varson<br>Washington, D.C.;<br>Philip O. Hackelton, Suitland; Anthony A. Berlinsky, Silver Spring, Md. |
|---|---|---|
| [21] | Appl. No. | 823,353 |
| [22] | Filed | May 9, 1969 |
| [45] | Patented | Apr. 20, 1971 |
| [73] | Assignee | the United States of America as represented by the Secretary of Commerce |

[54] AUTOMATIC CAMERA AND LOOSE SHEET TURNER USING VACUUM CONVEYOR BELTS
12 Claims, 8 Drawing Figs.

[52] U.S. Cl. ................................................. 355/23, 271/74
[51] Int. Cl. .......................................... G03b 27/32, G03b 27/46
[50] Field of Search .................................... 101/222, 223, 230; 271/74, (Digest 9); 355/23

[56] References Cited
UNITED STATES PATENTS
2,194,808  3/1940  Pooley.......................... 355/23

Primary Examiner—Samuel S. Matthews
Assistant Examiner—M. L. Gellner
Attorneys—David Robbins and Alvin J. Englert ABSTRACT: An arrangement is described for photographing both sides of loose sheets arranged in a stack. A sheet is carried on a vacuum belt to a first area where side A is photographed. The sheet is then turned and transferred to another vacuum belt which moves the sheet to a second area while a second sheet is moved to the first area. Side B of the first sheet and side A of the second sheet are then photographed. Included are means for detecting a double sheet fed to the first belt or a sheet not fed completely off the second belt.

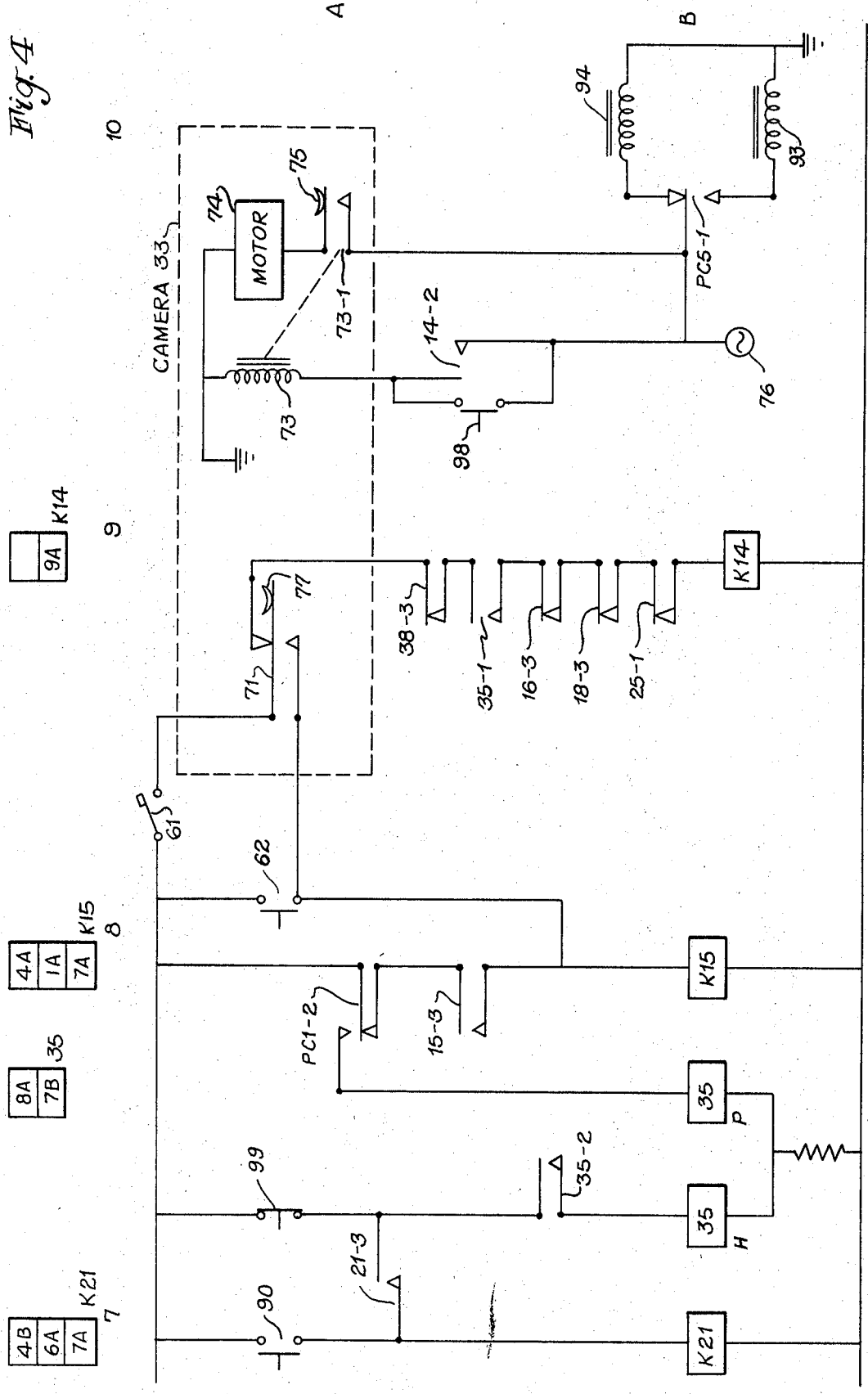

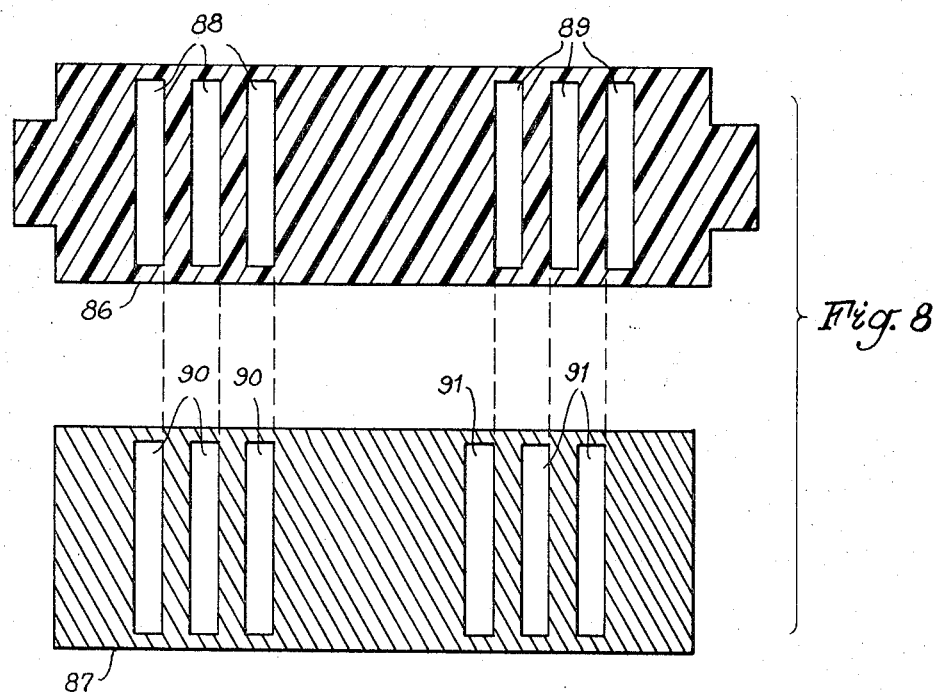

AUTOMATIC CAMERA AND LOOSE SHEET TURNER USING VACUUM CONVEYOR BELTS

BACKGROUND OF THE INVENTION

In the prior art, when more than one loose sheet had to be photographed on both sides, each sheet was positioned by hand for location and squareness and then photographed. The sheet was then turned and positioned, again by hand, and the other side was photographed. If the sheet was wavy or folded, it had to be held flat by a piece of glass or vacuum before it was photographed. If the sheet was wrinkled, it had to be smoothed by hand before it was held flat by the glass or vacuum.

When the principles of the present invention are employed, the sheet is automatically smoothed, positioned, and photographed. It is then automatically turned and transferred to another area where the other side is photographed.

SUMMARY OF THE INVENTION

When the present invention is used to photograph a plurality of loose sheets, each sheet is fed in sequence to a moving conveyor belt and automatically positioned in a first area where it is photographed. The sheet is then automatically turned and fed to another conveyor belt which carries it to a second area where the other side is photographed.

In one embodiment, a sheet is fed from a feeder to a first vacuum belt which carries the sheet to a first photograph area where it comes to rest. Side A of the sheet is then photographed. The first sheet is then carried on the first belt to a transfer area where a second vacuum belt is positioned adjacent to the first and is driven in a direction opposite to that of the first. A vacuum source is normally applied to the portion of the first belt in the transfer area and is removed shortly after the first sheet arrives in the area. Thus, the first sheet is transferred, with side B up, from the first to the second belt and is then carried to another photograph area where it comes to rest. At the same time a second sheet is carried from the feeder to the first area. Side B of the first sheet and side A of the second sheet are then photographed simultaneously. The first sheet is then moved to a stacker, while the second sheet is moved to the second area and a third sheet is moved to the first area.

The feeder is inactivated when an item fed to the first belt is thicker than a single sheet, e.g., when a double sheet is fed, or the sheet contains a paper clip or similar object. Simultaneously, a camera cycle is inhibited and the first belt is stopped so that the item comes to rest in the first area but is not photographed.

If a sheet is not moved entirely off the second belt to the stacker, circuits are completed to inhibit the operation of the camera which prevents a bad frame from being taken.

BRIEF DESCRIPTION OF THE DRAWING

FIGS. 2, 3, and 4 comprise a circuit diagram of the control circuits used in FIG. 1;

FIG. 5 is a block diagram illustrating the assembly of FIGS. 2 to 4;

FIG. 6 is a side view of the transfer unit used in FIG. 1;

FIG. 7 is a top view of the transfer unit in FIG. 1; and

FIG. 8 illustrates the slide and metal plate employed in the transfer unit in FIG. 6.

DESCRIPTION OF THE PREFERRED EMBODIMENT

Block Diagram

Figure 1:
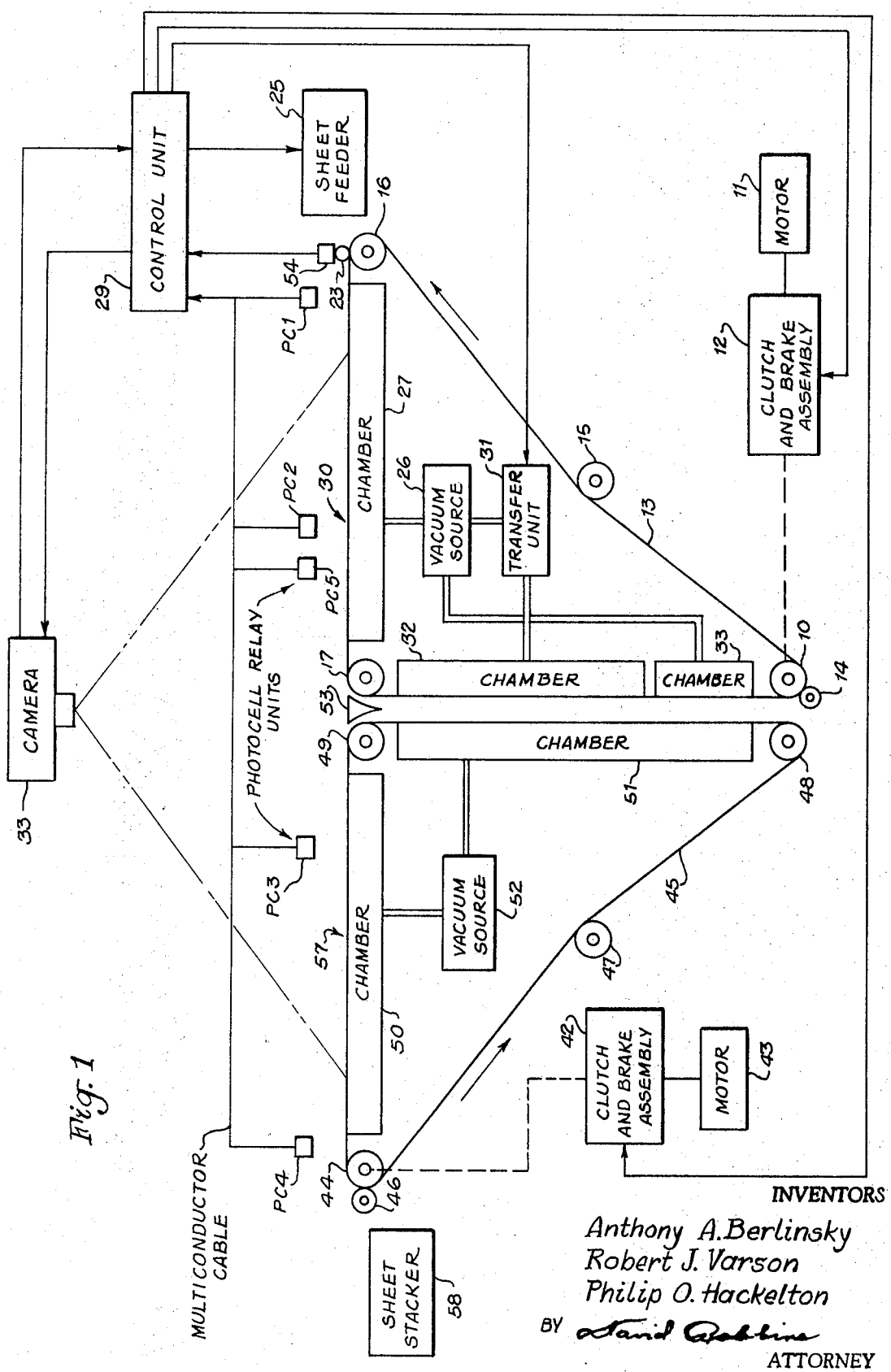
FIG. 1 is a block diagram of an embodiment of the invention.

Automatic Operation. With reference to FIG. 1, when the sheet turner is in operation, roller 10 is driven by motor 11 through clutch and brake assembly 12. The roller in turn drives perforated conveyor belt 13 in the direction shown in the FIG. Roller 14 functions as a pressure roller, 15 as an idler roller, and 16 and 17 as follower rollers.

Feeder 25 feeds a first sheet between roller 23 and moving belt 13. The sheet is held against the belt by vacuum applied by source 26 through chamber 27, which has a pattern of perforations in its side adjacent to perforated belt 13. The speed of the feeder is slower than that of the belt so that the belt tries to stretch the sheet which is smoothed if it contains waves, wrinkles or folds. The hopper of feeder 25 is aligned with belt 13 to provide vertical and horizontal alignment of the sheet on the belt. Hence the sheet is positioned for location and squareness in the first photograph area 30 when the belt comes to rest as described immediately below.

As the first sheet is carried on belt 13, it is sensed by the photocells in units PC1 and PC2. The output of the photocells energize relays whose contacts open circuits in control unit 29 to release the clutch and activate the brake in assembly 12. Belt 13 then stops and the first sheet is positioned in area 30. The relay in PC1 also operates control circuits in 29 which inactivate feeder 25 and initiate a cycle of operation of camera 33. Side A of the sheet is then photographed. During the camera cycle, contacts are closed to activate a circuit in unit 29 to restart the movement of belt 13. Simultaneously, circuits are completed in 29 which cause feeder 25 to supply a second sheet to belt 13.

When the first sheet is in area 30, it is sensed by the photocell in unit PC5 which energizes the relay in the unit 29. As the relay is energized, its contacts complete a control circuit in unit 29 to operate transfer unit 31. The output of vacuum source 26 is then applied through 31 to chamber 32. It is noted that the output of the source is applied continually to chamber 33.

There are a number of holes in the sides of chambers 32 and 33 adjacent to perforated belt 13. There are also a number of holes in the ends of chambers 27 and 32 adjacent to roller 17, which contains a plurality of holes in its circumferential surface. Thus, vacuum is applied from source 26 through the chambers to the roller.

When belt 13 is restarted, the first sheet is moved over roller 17 on its way to a position over chambers 32 and 33. If the vacuum in the roller is not strong enough to hold the sheet against the belt and it continues to move in a horizontal direction, the sheet is deflected downward on the belt by guide 53.

When the first sheet is in area 30, it is sensed by the photocell in unit PC2 which, as previously indicated, energizes the relay in PC2. This causes a control circuit in unit 29 to be conditioned for operation. As the sheet leaves area 30, its trailing edge is sensed by the photocell in unit PC5. The relay in PC5 is then released to complete the circuit conditioned for operation. When the circuit is completed, the brake in assembly 42 is released and the clutch is engaged so that motor 43 drives roller 44. The roller in turn drives perforated conveyor belt 45 in the direction shown in the FIG. Pressure roller 46 keeps constant pressure on belt 45 against roller 44. Roller 47 is an idler roller, while 48 and 49 are follower rollers.

Chambers 50 and 51 have a plurality of holes in their sides adjacent to perforated belt 45 and a plurality of holes in their ends adjacent to roller 49. The roller has a pattern of perforations in its outer circumferential surface. Hence source 52 applies vacuum through the chambers to the roller. It will be understood that vacuum sources 26 and 52 could be combined as a single source of vacuum or that separate sources could be used for each chamber in FIG. 1.

After belt 13 is restarted, as the first sheet leaves area 30 and moves to its position over chambers 32 and 33, its trailing edge is sensed by the photocell in unit PC5. The photocell releases the relay in PC5 to operate transfer unit 31. The transfer unit then cuts off the vacuum to chamber 32 and vents vacuum source 26 to the atmosphere. When the vacuum is cut off, the lower portion of the first sheet is held in position on belt 13 by the vacuum in chamber 33, while the upper portion is transferred by the vacuum in chamber 51 to a position on belt 45 over 51. This occurs momentarily before belt 45 is started. When the belt is started, it is driven at a speed slightly greater than the speed of belt 13, and the sheet is stretched so that any waves, wrinkles, or folds in the sheet are removed as the lower portion of the sheet is transferred to belt 45.

It should be observed that when the first sheet is in area 30, it is in a substantially horizontal position with side A up. When the sheet is moved to the position over chambers 32 and 33, it is turned to a substantially vertical position, and when transferred to belt 45, the sheet has side B up.

As the first sheet is carried on belt 45, it passes over roller 49. If the vacuum applied to the roller is not strong enough to hold it against the belt so that the sheet continues to move upward, guide 53 deflects it around the roller and onto the belt.

The first sheet is then carried on belt 45 to a position over chamber 50 where it is sensed by the photocell in unit PC3. The output of the photocell operates a circuit that releases the clutch and activates the brake in assembly 42 to stop belt 45. When the belt is stopped, the sheet is in a second photograph area 57 with its side B up.

It will be recalled that when the first sheet was in area 30, a camera cycle was initiated and side A of the sheet was photographed by camera 33. Simultaneously, circuits were completed to feed a second sheet to belt 13. The second sheet is carried to area 30, belt 13 is stopped, and another camera cycle is initiated, as described above. During this camera cycle, side B of the first sheet is photographed in area 57, and side A of the second sheet is photographed in area 30. During the cycle, contacts in camera 33 are transferred to operate circuits in control unit 29 that start the operation of belt 13 and sheet feeder 25. As the second sheet leaves area 30, transfer unit 30 is activated and belt 45 is started, as previously indicated. The first sheet is then moved from belt 45 to sheet stacker 58, the second sheet from area 30 to area 57, and a third sheet to photograph area 30.

If the first sheet is not moved completely off belt 45, it is sensed by the photocell in unit PC4. The relay in PC4 will respond to the photocell's output to operate a circuit in control unit 29 that inhibits the operation of camera 33. This prevents a bad frame from being taken by the camera.

The sheet turner continues in the manner indicated above until the last sheet is fed from feeder 25 to the first photograph area 30. The sheet just ahead of this one is transported to the second photograph area 57. After the camera cycle that occurs now, just as before, the last sheet is carried from 30 to 57 where side B of the sheet is up. Belt 13 is moving and feeder 25 is trying to supply another sheet to belt 13. Since there are no more sheets to be fed, the operator closes a switch in control unit 29 to operate assemblies 12 and 42 and stop belts 13 and 45. When this switch is closed, circuits are completed to prevent feeder 25 from supplying another sheet to belt 13 and to inhibit the operation of camera 33. The operator then depresses another switch in control unit 29 to initiate a camera cycle during which camera 33 photographs side B of the last sheet. She then operates a switch in control unit 29 to cause assemblies 12 and 42 to drive belts 13 and 45, respectively. Belt 45 then carries the last sheet to stacker 58. After these operations are completed, the operator opens the main power switch (not shown) and reloads feeder 25 and camera 33, if necessary. She may then place the sheet turner and camera in automatic operation.

Double Sheet and Clip Detector. If more than one sheet is fed from feeder 25 to belt 13 or if the sheet contains a paper clip, staple, or similar object, so that the item fed to the belt is thicker than one sheet, roller 23 moves upward to close microswitches 54. Circuits are then completed in unit 29 to inactivate feeder 25 and inhibit the operation of camera 33. The undesired item is transported on belt 13 to the first photograph area 30. However, since a camera cycle is not initiated, belt 13 is not restarted in the manner described above, and the item remains at rest in the first photograph area. The item is corrected before continuing operation.

Manual Operation. In manual operation, the operator closes momentarily a pair of switches in control unit 29 to complete circuits that cause feeder 25 to supply a first sheet to belt 13 and to cause the belt to carry the sheet to area 30. She then momentarily closes another switch in 29 to initiate a camera cycle, whereby side A of the sheet is photographed by camera 33.

During the camera cycle, circuits are completed in control unit 29 to start belt 13 and to effect another feed cycle in feeder 25. As the first sheet moves away from area 30, circuits are completed to start belt 45 and to operate transfer unit 31, as previously described. The first sheet is then moved to area 57 with its B side up, while a second sheet is moved, with its side A up, to area 30. The operator then closes the latter switch, again momentarily, to initiate another camera cycle during which side B of the first sheet and side A of the second sheet are photographed by camera 33. The operator may continue this mode of operation or may close the appropriate circuits in control unit 29 to place the sheet turner and camera in automatic operation.

Notation

Figure 2:
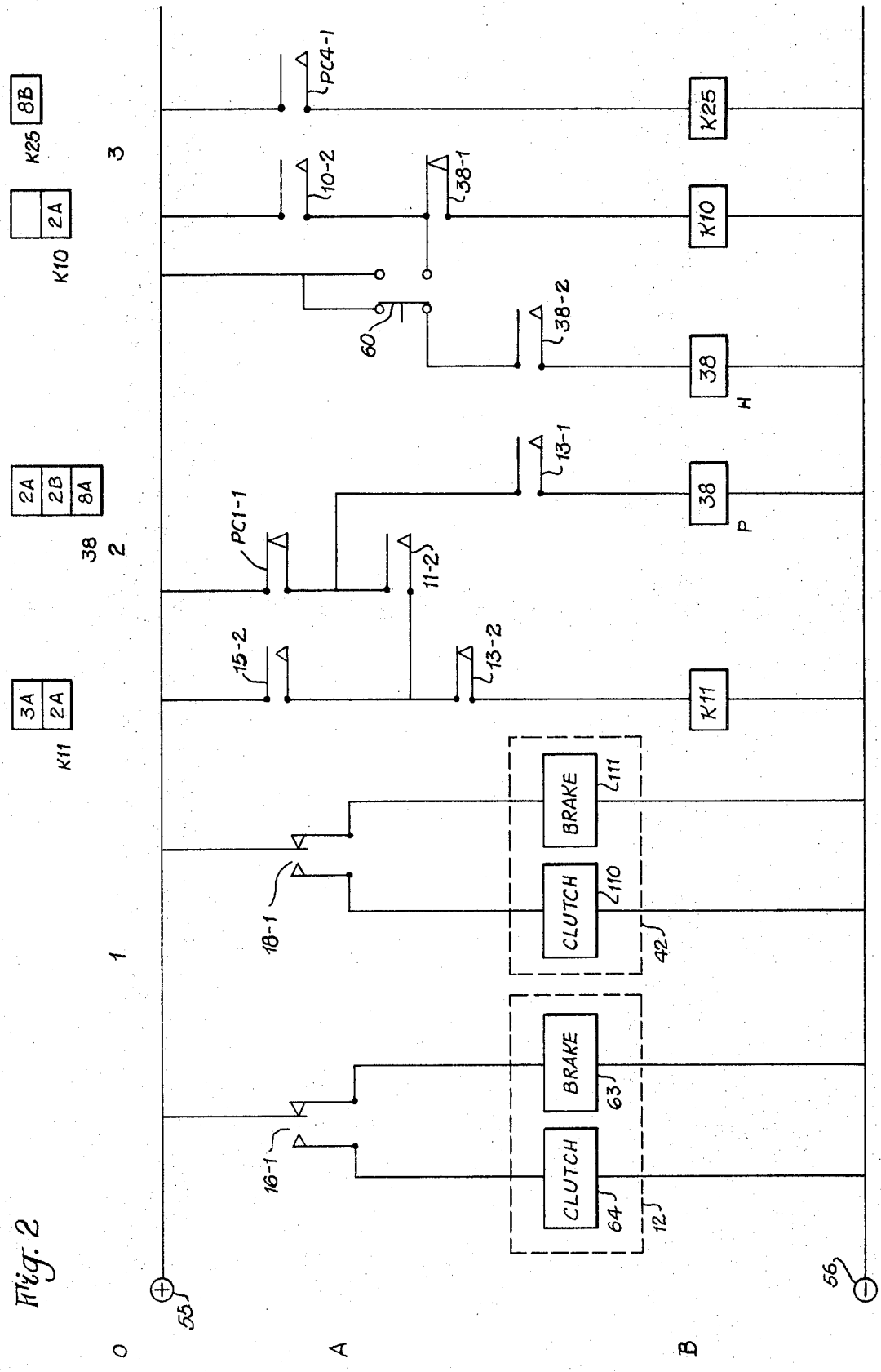
Figure 3:
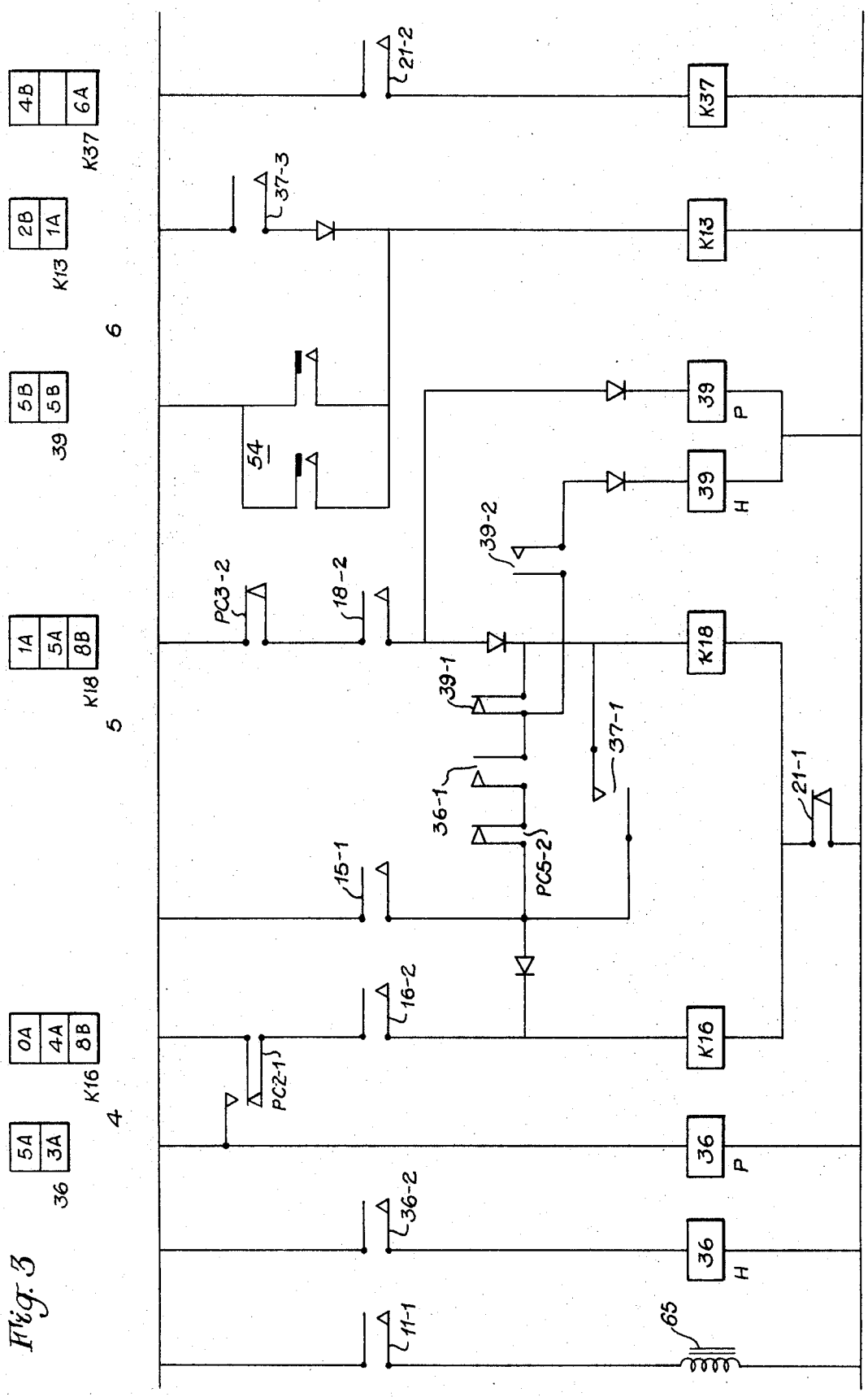

When FIGS. 2, 3, and 4 are arranged as shown in FIG. 5, numbers ranging from 0 to 10 appear along the top of the FIGS. and letters A and B appear along the left-hand margin of FIG. 2 and the right-hand margin of FIG. 4. This forms a coordinate system which may be used to locate the contacts of the relays in the FIGS. For example, relay K15 is associated with rectangle K15 which is located in the top margin of FIG. 4. The rectangle is divided into sections marked 4A, 1A, and 8A, representing contacts K15-1, K15-2 and K15-3 of relay K15, respectively. The notation in each section designates the location of the associated contact in the FIGS. Thus, to use the notation 4A to locate contacts K15-1, find the area between the numbers 4 and 5 along the top of the assembled FIGS. and proceed to the A or upper portion of the FIGS.

When a rectangle has a P nearby, it represents the pick coil of a relay, the number of which appears in the rectangle. A pick coil is energized quickly and used for operations that are not to be maintained a long period of time. When a rectangle has an H nearby, it represents a coil used in a hold circuit for the relay whose number appears in the rectangle. Thus, relay 38 comprises a pick coil represented by 38P in FIG. 2 and a hold coil represented by 38H. The relay controls contacts 38-1, 38-2 and 38-3.

Circuit Diagram

Automatic Operation. With reference to FIGS. 2, 3, and 4, terminals 55 and 56 represent the positive and negative terminals, respectively, of a DC source of potential.

To place the sheet turner in automatic operation, the operator depresses momentary contact switch 60 (FIG. 2) and latching key 61 (FIG. 4). When switch 60 is depressed, relay K10 is picked up. Contacts 10-2 close to establish a hold circuit for K10 and the contacts related to this relay in sheet feeder 25 (FIG. 1) close to start the motor in the feeder. When key 61 is depressed, relay K14 is conditioned to initiate a camera cycle when relay 35 is energized as described below.

The operator then strikes momentary contact switch 62 in FIG. 4 to pick up relay K15. Contacts 15-3 close to establish a hold circuit for this relay and contacts 15-2 make to pick up relay K11. When K11 is energized, contacts 11-2 establish a hold circuit for K11. Contacts 11-1 close to energize solenoid 65 in FIG. 3, which is located in feeder 25 in FIG. 1 and causes 25 to feed a first sheet between roller 23 and belt 13. At the same time contacts 15-1 close to energize relay K16 in FIG. 3 and contacts 16-2 make to complete a hold circuit for K16. Contacts 16-1 transfer to release brake 63 and to energize clutch 64 in assembly 12. Belt 13 is then driven by motor 11 in the direction shown in FIG. 1.

Contacts 16-3 open to inhibit the occurrence of a camera cycle until the first sheet comes to rest in the first photograph area 30, as described below.

During normal operation, the sheet is fed by feeder 25 between roller 23 and belt 13 in FIG. 1 and is carried on the belt where it is sensed by the photocell in unit PC1. The relay in the unit is then activated by the output of the photocell to open contacts PC1-1 (FIG. 2) and to transfer contacts PC1-2 (FIG. 4). When the latter contacts are transferred, relay K15 drops out. Contacts 15-2 open and since contacts PC1-1 were just opened, relay K11 drops out. Contacts 11-1 then open to deenergize solenoid 65 in feeder 25 so that another sheet can not be supplied by the feeder at this time.

The sheet continues to move on belt 13 until it is sensed by the photocell in unit PC2 in FIG. 1. The relay in the unit responds to the output of the photocell to transfer contacts PC2-1 in FIG. 3, dropping out relay K16. (Contacts 15-1 opened when relay 15 was released.) Contacts 16-1 in FIG. 2 transfer to their normal position, releasing clutch 64 and energizing brake 63 in assembly 12. Belt 13 in FIG. 1 is then stopped and the sheet is positioned with its side A up in the first photograph area 30.

When relay K16 drops out, contacts 16-3 are closed to permit the occurrence of the camera cycle that will be described now.

When the first sheet is sensed by the photocell in unit PC1, contacts PC1-2 in FIG. 4 are transferred to pick up relay coil 35P. Contacts 35-2 make to pick up relay coil 35H, holding relay 35 energized and contacts 35-1 closed. A circuit is then completed through closed switch 61 and contacts 71, located in camera 33, to energized relay K14. When this relay is energized, contacts 14-2 complete a circuit to AC source 76. This activates start solenoid 73, and contacts 73-1 make to energize motor 74. Cam 75 is then driven by the motor and keeps contacts 73-1 closed for a selected time interval. After the contacts are released by the cam, the motor is deenergized and stops.

During the operation of motor 74, a camera cycle is initiated and completed. In the first part of the cycle, side A of the first sheet is photographed by camera 33, and in the second part, the film in the camera is advanced. While the film is advanced, cam 77 operates to transfer the arm of switch 71. A circuit is then completed through the switch to pick up relay K15. Contacts 15-3 close to establish a hold circuit for K15. Contacts 15-1 close to pick up relay K16 and contacts 16-1 transfer to activate circuits that cause belt 13 to move in the direction shown in FIG. 1. Contacts 15-2 close to pick up relay K11 so that contacts 11-1 make to energize feed solenoid 65. The second sheet is then supplied to belt 13.

While the first sheet is in photograph area 30, it is sensed by the photocell in unit PC2-1, and contacts PC2-1 in FIG. 3 transfer to energize relay coil 36P. Contacts 36-2 close to pick up relay coil 36H, and relay 36 remains energized. Contacts 36-1 make. At the same time, the sheet is sensed by the photocell in unit PC5. The relay in this unit responds to the output of the photocell to open contacts PC5-2 in FIG. 3. When belt 13 is restarted during the camera cycle just described the sheet moves from the area sensed by the latter photocell and contacts PC5-2 close. Since contacts 15-1 were closed during the camera cycle, a circuit is not completed to pick up relay K18. Contacts 18-1 are then transferred and brake 111 in assembly 42 is released while clutch 110 in the same assembly is engaged so that motor 43 drives belt 45 in the direction shown in FIG. 1. Contacts 18-3 open to inhibit the occurrence of a camera cycle while belt 45 is in motion.

When relay K18 is energized contacts 18-2 close to establish a hold circuit for relay K18 and a circuit is also completed to pick up relay coil 39P. Contacts 39-2 close to pick up relay coil 39H so that relay 39 remains energized. At the same time contacts 39-1 open the circuit through contacts 15-1 and 36-1 to relay K18.

With reference to FIGS. 6 and 7, transfer unit 31 includes housing 78 which comprises plate 79 and compartments 80, 81, and 82. Port 83 is connected between vacuum source 26 (FIG. 1) and compartment 80, while port 84 is connected between compartment 82 and chamber 32 (FIG. 1). Port 85 is open to the atmosphere. Slide 86, which is made of Teflon, is slidably mounted to form one side of compartment 80, while metal plate 87 forms one side of compartments 81 and 82.

Slide 86 and 87 are shown in detail in FIG. 8. The slide contains holes 88 and 89, while the plate contains holes 90 and 91. The holes in the slide are spaced relative to each other and relative to the holes in the plate in the manner illustrated in the FIG. More specifically, all the holes in slide 86 and plate 87 have substantially the same dimensions, and the spacings between all the holes are substantially equal to the width of the holes. The holes 88 in slide 86 are aligned with the holes 90 in plate 87, while the holes 89 are offset the width of a hole from the holes 91.

When the first sheet is in area 30, it is sensed by the photocell in unit PC5 which operates the relay in the unit to transfer contacts PC5-1 in FIG. 4. When the contacts are transferred, solenoid 93 is energized and slide 86 is pulled to the right in FIG. 6. Port 84 is then open, as shown in the FIG., and port 85 is closed. When the former port is open, the output of vacuum source 26 in FIG. 1 is applied to chamber 32.

When belt 13 is started during a camera cycle as described above, the first sheet is carried on the belt, and as the trailing edge of the sheet leaves the area sensed by the photocell in unit PC5, the relay in the unit is released and contacts PC5-1 transfer to energize solenoid 94. Slide 86 is then moved to the left in FIG. 6, and port 84 is closed while port 85 is opened. When the latter port is opened, the output of vacuum source 26 is vented to the atmosphere.

After the first sheet leaves the area sensed by the photocell in PC5, it is carried on belt 13 to a position over chambers 32 and 33. When transfer unit 31 cuts off the vacuum to chamber 32, the sheet is held in position on belt 13 by the vacuum in chamber 33. The timing of the operation of belt 45 and transfer unit 31 is such that the upper portion of the sheet is transferred by the vacuum in chamber 51 to a position over 51 just before the belt is started. When belt 45 is started, its speed is slightly greater than the speed of belt 13. Hence the sheet is stretched and smoothed as it is transferred to belt 45.

The first sheet is then transported by the latter belt until it is sensed by the photocell in unit PC3 when the output of the photocell operates the relay in PC3 to open contacts PC3-2 in FIG. 3, dropping out relay K18. Contacts 18-1 then transfer so that brake 111 in assembly 42 is energized, clutch 110 is released, and belt 45 comes to rest. The first sheet in is then located in the second photograph area 57.

As the first sheet is stopped in area 57 with side B up, the second sheet is stopped in area 30 with side A up. During the camera cycle that occurs now, side B of the first sheet and side A of the second sheet are photographed by camera 33. During the cycle contacts 71 (FIG. 4) are transferred to pick up relay K15 which starts the movement of belt 13 and initiates the operations that cause feeder 25 to feed a third sheet to the belt. The second sheet then moves to a position on belt 13 over chamber 32.

When the photocell in unit PC5 senses the trailing edge of the second sheet, it initiates the series of operations that causes the second sheet to transfer from belt 13 to belt 45. As the second sheet is brought up to area 57, the first sheet is moved to stacker 58, and the third sheet is moved to area 30.

If during the latter operation the second sheet is not carried all the way off belt 45 into stacker 58, the sheet is sensed by the photocell in unit PC4. Contacts PC4-1 in FIG. 2 will then close to pick up relay K25. Contacts 25-1 will open to inhibit the camera cycle which prevents a bad frame from being taken by camera 33.

As the last sheet is carried from feeder 25 to the first photograph area 30 on belt 13, the sheet just ahead of this one is carried to the second photograph area 57 on belt 45. After the camera cycle that occurs now, just as before, the last sheet is transferred from the first to the second photograph area and at the same time the sheet preceding the last on is moved from belt 45 to stacker 58. Belt 13 is moving and feeder 25 is trying to feed another sheet to the belt. Since there are no more sheets to be fed, the operator depresses momentary contact switch in 90 in FIG. 4, which picks up relay K21. Contacts 21-3 are then closed to establish a hold circuit for K21 through switch 99 while contacts 21-1 open to release relays K16 and K18. Contacts 16-1 and 18-1 are then transferred and belts 13 and 45 come to rest.

Contacts 21-2 close to pick up relay K37. Contacts 37-1 make, and contacts 37-3 close to pick up relay K13. When relay K13 is energized, contacts 13-1 close to pick up relay coil 38P. Contacts 38-2 close to pick up relay coil 38H, whereby relay 38 is activated. A hold circuit for the relay is established through switch 60. Contacts 38-1 open to drop out relay K10. When this relay drops out, its related contacts in feeder 25 open and the motor in the feeder is deenergized. Contacts 13-2 open to release relay K11. This inhibits the operation of feed solenoid 65 so that feeder 25 can not supply another sheet to belt 13. Simultaneously, contacts 38-3 open to prevent relay 14 from being picked up, which inhibits the camera cycle described above.

The operator then depresses momentary contact switch 98 in FIG. 4 which energizes solenoid 73 and initiates a camera cycle, as previously indicated. During the camera cycle, side B of the last sheet is photographed by camera 33, and relay 15 is energized. Contacts 15-3 close to establish a hold circuit for this relay.

The operator then momentarily opens switch 99 in FIG. 4, which is a spring-loaded, normally closed switch. This releases relay K21. Contacts 21-2 open to release relay K37, and contacts 37-1 break. Before 37-1 break, however, a pulse in transmitted through 15-1 and 37-1 to operate relay and K18. (The same pulse energizes relay 16.) Contacts 18-2 establish a hold circuit for K18, and contacts 18-1 transfer to release brake 111 and engage clutch 112 in assembly 42. Belt 45 is then driven to move the last sheet from the second photograph area 57 to stacker 58. (At the same time, when K16 is energized, contacts 16-1 transfer to drive belt 13.)

The operator then opens the main power switch (not shown) for the sheet turner which stops belts 13 and 45 and releases any relays in FIGS. 2 to 4, such as relay 36, that may be energized. She then reloads sheet feeder 25 and camera 33, if necessary, and places the arrangement disclosed in automatic operation by depressing switches 60 and 62, as previously described.

Double Sheet and Clip Detector

If more than one sheet is fed from feeder 25 to belt 13 in FIG. 1, or if the sheet being fed contains a paper clip, or similar object, so that the item supplied by the feeder is thicker than one sheet, roller 23 moves upward and microswitches 54 are closed. When the microswitches close, relay K13 in FIG. 3 is activated. Contacts 13-1 close, completing a circuit that picks up relay coil 38P and contacts 38-2 close to pick up relay coil 38H, whereby relay 38 is energized. A hold circuit for 38 is established through switch 60. Contacts 38-1 open to drop out relay 10. When the latter relay drops out, its related contacts in feeder 25 open and the motor in the feeder is deenergized. Contacts 13-2 open to release relay K11 and contacts 11-1 open to inhibit the operation of feed solenoid 65 so that another sheet can not be supplied to belt 13. At the same time, contacts 38-3 open to prevent relay 14 from being energized, which inhibits the camera cycle described above.

Since the camera cycle does not occur, belt 13 is not restarted and the undesirable sheet or sheets come to rest in the first photograph area 30. After removing the sheet or sheets, the operator may restart the sheet turner by depressing switch 60 in FIG. 2, which releases relay 38 and completes the circuit to relay K14 to initiate the series of operations described under Automatic Operation.

Manual Operation

In manual operation, the operator depresses keys 60 and 62 in FIGS. 2 and 4, respectively. When key 62 is depressed, relay K15 is operated. Contacts 15-1 close to pick up relay K16 which starts the movement of belt 13, as previously described. Contacts 16-2 establish a hold circuit for K16. Contacts 15-3 make, setting up a hold circuit through PC1-2. Contacts 15-2 make to pick up relay K11 and contacts 11-1 close to complete a circuit to activate feed solenoid 65 (FIG. 3), which is located in feeder 25 (FIG. 1).

When key 60 is depressed, relay K10 is picked up and contacts (not shown) in feeder 25 are closed to start the motor in the feeder. Contacts 10-2 close to set up a hold circuit for relay K10. A first sheet is then fed from feeder 25 to belt 13 and is moved to the first photograph area 30 where it is sensed by the photocells in units PC1 and PC2. The output of the photocell in PC1 operates its related relay to transfer contacts PC1-2 in FIG. 4. Relay K15 then drops out and contacts 15-1 open one circuit to relay K16. The output of the photocell in PC2 energizes its associated relay and contacts PC2-1 in FIG. 3 transfer to energize relay 36 and to break the other circuit to K16, which drops out. When relay 36 is energized contacts 36-1 close, and when relay K16 is deenergized, contacts 16-1 transfer to release clutch 64 and engage brake 63 so that belt 13 is stopped, and the first sheet comes to rest in the first photograph area 30.

When contacts PC1-2 (FIG. 4) transferred, relay 35 was energized and contacts 35-1 closed. Since switch 61 is open during this mode of operation, relay K14 is not energized to initiate a camera cycle. Accordingly, the operator strikes key 98 to energize solenoid 73 which initiates the camera cycle described above. During the cycle, side A of the first sheet is photographed by camera 33.

The operator now depresses key 63 and relay K15 is picked up. When relay K15 is energized, contacts 15-2 close, picking up relay K11. Contacts 11-1 then complete a circuit to solenoid 65, and a second sheet is supplied by the feeder 25 to belt 13. Meanwhile contacts K15-1 close and a circuit is completed to pick up relay K16. Contacts 16-1 transfer and assembly 12 drives belt 13.

The second sheet is then carried to area 30 while the first sheet is carried on belt 13 to a position over chamber 32. As the latter sheet leaves the area sensed by the photocell in unit PC5, the relay in the unit is released and contacts PC5-2 close. Since contacts 36-1 closed when relay 36 was energized, a circuit is now completed to pick up relay K18. Contacts 18-1 then transfer and assembly 42 drives belt 45.

Further, as the first sheet leaves the area sensed by the photocell in PC5, contacts PC5-1 in FIG. 4 transfer to operate transfer unit 31. The transfer unit cuts off the vacuum to chamber 32 and the first sheet is transferred with side B up to a position on belt 45 over chamber 51. The first sheet is then transported to the second photograph area 57.

As the second sheet arrives in the first photograph area 30, it is sensed by the photocells in units PC1 and PC2. The output of the photocells cause contacts PC1-2 (FIG. 4) and PC2-1 (FIG. 3) to transfer. Relay K16 is then released, contacts 16-1 transfer, and assembly 12 stops belt 13. Likewise, as the first sheet arrives in the second photograph area 57, it is sensed by the photocell in unit PC3. Contacts PC3-2 then open the circuit to relay K18, which drops out. Contacts 18-1 transfer and assembly 42 stops belt 45.

In this way, the first sheet comes to rest in area 57, with B side up, and the second sheet comes to rest in area 30, with side A up. The operator may now depress switch 98 to initiate another camera cycle during which side B of the first sheet and side A of the second sheet are photographed by camera 33. The second sheet is then fed to area 57 and a third sheet is fed to area 30 in the manner just described. As an alternative course of action, when the second sheet is in area 30 and the first sheet in area 57, the operator may close switch 61 (FIG. 4) and place the sheet turner and camera in automatic operation.

We claim:
1. A camera and automatic sheet turner comprising:
a first and second perforated conveyor belt;
photographing means positioned to photograph a first and second area including a part of the first and second belt, respectively;
at least one vacuum source;
means for applying the output of said vacuum source to a first section of said first belt and to a first section of said second belt;
feeding means for feeding a sheet, having a side A and a side B, to the first section of said first belt, the sheet being fed to the latter section with its side A up;
first drive means for driving said first belt;
first activating means for activating said first drive means, whereby said first belt carries a sheet to said first area;
first inactivating means for inactivating said first drive means in such a way that said first belt is stopped with a sheet in said first area;
second activating means for activating said first drive means, whereby said first belt carries a sheet from the first area to a transfer area;
a first portion of said first and second belt being positioned with their faces adjacent to each other and moving in opposite directions in said transfer area;
means for applying the output of said vacuum source to the first portion of said second belt located in the transfer area;
transfer means for selectively applying the output of said vacuum source to a part of said first portion of said first belt in the transfer area;
the distance between the belts in the transfer area and the magnitude of the output of the vacuum source being such that a sheet is transferred from the first to the second belt with its side B up when said transfer means is selectively operated;
control means for selectively operating said transfer means;
second drive means for driving said second belt;
third activating means for activating said second drive means;
second inactivating means for inactivating said second drive means in such a way that said second belt is stopped with a sheet in said second area;
first operating means for activating said photographing means when a sheet is at rest in said first area, whereby side A of the sheet is photographed;
second operating means for activating said photographing means when a sheet is at rest in said first area and another sheet is at rest in said second area, whereby side A of the first sheet and side B of the latter sheet are photographed simultaneously; and
a sheet stacker positioned to receive a sheet as it leaves the first section of said second belt.

2. The camera and automatic sheet turner set forth in claim 1 including:
means for detecting the presence of a sheet on the first section of said first belt and wherein:
said first inactivating means includes:
means responsive to the output of said detecting means for inactivating said first drive means, whereby the first belt is stopped with a sheet in the first area.

3. The camera and automatic sheet turner set forth in claim 1 including:
first means for detecting the movement of a sheet from the feeding means to said first area;
second means for detecting the presence of a first sheet in the first area, and wherein:
said first inactivating means includes:
means responsive to the output of said second detecting means for inactivating said first drive means, whereby the first belt is stopped with a sheet in the first area; and
said first operating means includes:
means responsive to the output of said first and second detecting means for activating said photographing means, whereby side A of a sheet is photographed.

4. The camera and automatic sheet turner set forth in claim 1 including:
means responsive to the operation of said photographing means for generating a first control signal, and wherein:
said feeding means includes:
means responsive to said first control signal for feeding a sheet with its side A up to the first section of said first belt, and wherein:
said first activating means includes:
means responsive to said first control signal for activating said first drive means, whereby the first belt carries one sheet to said transfer area and another sheet to said first area.

5. The camera and automatic sheet turner set forth in claim 4 including:
means for generating a second control signal when an item having a thickness greater than a single sheet is fed by said feeding means to the first section of said first belt; and
means responsive to said second control signal for inhibiting the operation of said photographing means when the item is in said first area, whereby the first control signal is not generated so that another sheet is not fed to the first belt, the first belt is not driven and said item remains at rest in said first area.

6. The camera and automatic sheet turner set forth in claim 1 including:
means responsive to the presence of a sheet in the first area for conditioning said third activating means for operation;
means responsive to the operation of said photographing means when a sheet is in the first area for generating a control signal, and wherein:
said second activating means includes:
means responsive to said control signal for activating said first drive means, whereby the first belt carries a sheet from the first area to the transfer area; and
said third activating means includes:
means responsive to the movement of a sheet from the first area to the transfer area for activating said second drive means, whereby the latter means drives said second belt.

7. The camera and sheet turner set forth in claim 6 including:
means for detecting the presence of a sheet in the second area, and wherein: said second inactivating means includes:
means responsive to the output of the detecting means for inactivating said second drive means, whereby said second belt is stopped when a sheet is positioned in the second area.

8. The camera and automatic sheet turner set forth in claim 1 including:
means responsive to the movement of a sheet from said feeding means to said first area for generating a first control signal;
means responsive to the presence of a sheet in the first area for generating a second control signal, and wherein:
said first operating means includes:
means responsive to said first and second control signal for activating said photographing means.

9. The camera and automatic sheet turner set forth in claim 1 including:
means responsive to the movement of a sheet from said feeding means to said first area for generating a first control signals;
means responsive to the presence of a sheet in said first area for generating a second control signal;
means responsive to the presence of a sheet in said second area for generating a third control signal; and wherein
said second operating means includes:

means responsive to said first, second, and third control signal for activating said photographing means.

10. The camera and sheet turner set forth in claim 1 wherein:
said transfer means in one mode of operation applies the output of said vacuum source to said first portion of said first belt in the transfer area; and
said control means includes:
means responsive to the movement of a sheet from the first area to the transfer area for removing the output of said vacuum source from said first portion of said first belt in said transfer area.

11. The camera and sheet turner set forth in claim 1 including means for continuously applying the output of said vacuum source to a second portion of said first belt located in the transfer area.

12. The camera and automatic sheet turner set forth in claim 1 including:
means for detecting the presence of a sheet on said second belt between the second area and the stacker; and
means responsive to the output of the detecting means for inhibiting the operation of said photographing means.